United States Patent
Syrjärinne

(10) Patent No.: US 7,395,074 B2
(45) Date of Patent: Jul. 1, 2008

(54) POSITION DETECTION WITH FREQUENCY SMOOTHING

(75) Inventor: Jari Syrjärinne, Tampere (FI)

(73) Assignee: Nokia Corporation, Espoo (FI)

( * ) Notice: Subject to any disclaimer, the term of this patent is extended or adjusted under 35 U.S.C. 154(b) by 642 days.

(21) Appl. No.: 10/821,126

(22) Filed: Apr. 8, 2004

(65) Prior Publication Data

US 2005/0227706 A1  Oct. 13, 2005

(51) Int. Cl.
*H04B 7/10* (2006.01)
(52) U.S. Cl. .............. 455/456.1; 455/424; 455/255; 455/414.2; 455/404.2; 342/357.12
(58) Field of Classification Search ............ 342/358.12; 455/456, 255, 414.2, 404.2
See application file for complete search history.

(56) References Cited

U.S. PATENT DOCUMENTS

| | | | | |
|---|---|---|---|---|
| 6,459,407 | B1 * | 10/2002 | Akopian et al. | 342/357.12 |
| 6,771,215 | B2 * | 8/2004 | Akopian et al. | 342/357.12 |
| 6,865,380 | B2 * | 3/2005 | Syrjarinne | 455/255 |
| 2003/0109264 | A1 * | 6/2003 | Syrjarinne et al. | 455/456 |
| 2003/0119496 | A1 | 6/2003 | Gaal et al. | 455/424 |
| 2003/0201934 | A1 * | 10/2003 | Asher et al. | 342/357.12 |

FOREIGN PATENT DOCUMENTS

| | | |
|---|---|---|
| WO | WO 02/059639 | 8/2002 |
| WO | WO 03/034090 | 4/2003 |
| WO | WO 03/039020 | 5/2003 |

OTHER PUBLICATIONS

Int. Geodetic Symposium on Satellite Dopler Positioning (1982) pp. 1213-1231.

* cited by examiner

*Primary Examiner*—Joseph Feild
*Assistant Examiner*—David Q. Nguyen
(74) *Attorney, Agent, or Firm*—Ware, Fressola, Van Der Sluys & Adolphson LLP

(57) ABSTRACT

The invention relates to a method for calculating a position of a mobile communications equipment. In order to obtain a more accurate position information of the mobile communications equipment, receiving physical communication channels within the mobile communications equipment, receiving first signal codes within said physical communication channels, measuring a signal phase of said first signal code within said mobile communications equipment, measuring a pseudodoppler frequency within said physical communications channels within said mobile communications equipment, reducing a noise level of said measured signal phase by using said pseudodoppler frequency, and calculating said position of said mobile communications equipment using at least said noise level reduced signal phase, is proposed.

27 Claims, 4 Drawing Sheets

POSITION DETECTION WITH FREQUENCY SMOOTHING

FIELD OF THE INVENTION

The invention relates to a method for calculating a position of a mobile communications equipment, in particular a mobile phone. The invention further relates to a mobile communications equipment able to calculate a position. The invention also relates to a system for calculating a position of a mobile communications equipment as well as a module, a computer program and a computer program product for calculating a position of a mobile communications equipment.

BACKGROUND OF THE INVENTION

Position detection is a known method in third generation mobile communication. In particular for code division multiple access (CDMA) mobile stations (MS), position detection using Advanced Forward Link Trilateration (AFLT) is known.

Advance Forward Link Trilateration is a geolocation technique utilizing the time difference of arrival (TDOA) or a time of arrival (TOA) of radio signals from the base stations measured by mobile stations.

To allow calculation of the position of mobile stations, in particular a code phase is detected. The code phase may be the fraction of the code period that has elapsed since the latest code boundary. By using the code phase, the time of arrival or the time difference of arrival can be calculated.

Cellular network-related wireless location methods can be subdivided into three categories according to the mobile station and network functionalities. These three categories are pure network-based methods, MS-assisted network-based methods, and MS-based network-assisted methods.

For a pure network-based method, the network fulfills all the positioning functionalities including location measuring and position calculations. An MS itself does not take any active part in the process. Obviously, these methods are applicable to legacy cellular phones. However, the network may require some modifications to accommodate a wide range of hardware products.

The second category, MS-assisted network-based methods, consists of methods, which require at least some active participation from the MSs. An MS can take part in location measuring or doing some other positioning-dedicated tasks, while most of the positioning functionalities are still completed in the network. The role of an MS is solely to assist the network in positioning.

In MS-based network-assisted methods, the roles of the MSs and the cellular network are reversed in comparison to those in the second category method. An MS makes location measurements and calculates its own position. Thus, the role of the network is simply to assist MSs in location estimation. Methods of this type enable a denser position-fixing rate.

The simplest method for locating a cellular phone is CELL-ID, which is based on cell identification. An MS can be assigned a location if the cell in which the MS is located can be identified. Since this is an inherent feature of all cellular systems, minimal changes to existing systems are needed. A cell only has to be associated with a location, such as by association with the coordinates of the base station of this cell.

This method boasts the additional advantage that no calculations are needed to obtain location information. Thus, the CELL-ID based method is fast and suitable for applications requiring high capacity. However, the drawback is that accuracy depends directly on cell radius, which can be very large, especially in rural areas.

To allow position detection, geological techniques like time difference of arrival and time of arrival are known.

Applying these techniques requires that the number of measurements is adequate to make an accurate estimation of the mobile station location. For instance, it is required that at least three TDOA measurements are available for uniquely determining the MS position. However, the underlying communication system is designed to reduce the interference by maintaining the transmission powers of the MSs and BSs at a minimum required level in order to accommodate more users. Consequently, only when the MS is at the edge of a cell, may it obtain enough measurements for location estimation. This is known as the hearability problem.

The angle of arrival (AOA)-based location method is one of the oldest positioning methods. Its early use began during the development of radar, sonar, and antenna array techniques. By means of array signal processing techniques, the direction of an MS with respect to BSs can be measured at BSs. Thus, the MS is at the intersection of the lines derived from AOA measurements. The accuracy of the AOA method is dependent on the distances between the MS to be located and the antenna arrays at BSs. The further the MS is from the antenna arrays, the larger is the positioning uncertainty. Non-line-of-sight (NLOS) signal propagation is a significant source of inaccuracy. When NLOS components exist, AOA measurements will be distorted, thus resulting in degraded positioning accuracy.

The measurements required in Time of Arrival (TOA) methods are the absolute signal transmission times between MS and BSs that are equivalent to MS-BS distances. The MS is located at the intersection of several circles, of which the centres are the BSs used, and the radii are the measured MS-BS distances. At least three TOA measurements are required to uniquely determine the 2-D position of an MS.

TOA wireless location methods require that all base stations (BS) be precisely synchronized to each other and that the MS to be located be synchronized to the network as well. For this reason, TOA positioning is feasible only in fully synchronized networks; for example, in IS-95 CDMA systems.

The measurements in Time Difference of Arrival (TDOA) methods are relative signal transmission times, which are equivalent to distance differences. A TDOA measurement defines a hyperbola with two BSs as the foci. At least three hyperbolae are needed for unique MS position determination.

A TDOA method requires that all base stations involved be synchronized. This can be done either by synchronizing all BSs physically, or by bringing all BSs to a common reference time by measuring time differences between BSs. MSs do not need to be synchronized since the MS clock bias is the same with respect to all BSs and differencing any two TOA measurements will cancel out the MS clock bias. It may also be possible to provide the BSs with a time reference from a satellite based positioning signal, such as GPS.

In a CDMA System, a pilot phase signal is continuously transmitted. This signal allows mobile stations to detect the presence of CDMA channels and provides timing information for demodulation. According to mobile communication standard, the pilot signal is a DS spread spectrum signal. The spread function is a zero Walsh function. The signal is further modulated by a pseudo noise (PN) sequence of a particular base station. The pseudo noise sequences of different base stations only differ in an offset, which is a multiple of 64 pseudo noise chips.

In particular, there are 64 physical channels in the forward link of an IS-95 CDMA cellular system; these are distinguished by the 64 orthogonal Walsh functions, which serve as digital carriers. These physical channels form four types of logical channels.

First, the pilot channel is identified by Walsh function zero. It continuously broadcasts a known signal to provide the MSs a robust time, frequency, and phase reference for demodulation in other channels.

The pilot channel possesses dominant transmission power. Approximately 15-20% of the maximum transmission power of a BS is dedicated to the pilot channel to ensure the visibility of the pilot signal over the coverage area. This also makes pilot signals more easily acquired from neighboring cells as well. The pilot signal is a known continuous broadcasting signal. It enables an MS to keep locked on the pilot Pseudo Noise (PN) code. All BSs transmit the same PN sequence but with different offsets. This makes it easier in the search process of a receiver to acquire TDOA measurements.

The process of generating a pilot signal provides a zero Walsh function with a chip rate of 1.2288 Mcps (mega chips per second). It is first modulated by the pilot baseband "data". Then, this intermediate signal is separated into an I-component and a Q-component to further modulate the I-channel PN sequence and the Q-channel PN sequence. Wave shaping, amplification, and RF carrier modulation are finally conducted to generate the actual signal transmitted to MSs.

The Walsh code is one type of orthogonal code. It is used in IS-95 CDMA systems to separate different physical channels. Both the I-channel PN sequence and the Q-channel PN sequence are maximal length sequences generated by 15-stage shift registers and lengthened by the insertion of one chip per period in a specific location in the sequences. Thus, the sequence length is in chips. Each base station is distinguished by a different phase offset in both the I-channel and the Q-channel PN sequences. The offset is a multiple of 64 PN chips, which yields 512 possible 64-chip offsets. At a rate of 1.2288 Mcps, the I-sequence and Q-sequence repeat every 26.66 ms, or 75 times every 2 seconds.

The synchronization channel is identified by a Walsh function, and is a continuously broadcasting channel. It provides MSs with BS timing information, cell site identification number, and other information for synchronization.

In addition, there can be up to seven paging channels. A paging channel contains paging messages and conveys other control messages from the BSs to the MSs.

Eventually, there are at least 55 traffic channels. They carry user information. They also carry control messages using "blank and burst", which is a time multiplexing technique used on traffic channels to send overhead signaling or (optionally) secondary traffic in which a frame of primary digital voice data is blanked, i.e., not transmitted to allow the overhead or secondary traffic to be transmitted at a 9600 bit/second rate. In the blank-and-burst format, a frame or frames of primary digital voice data are suppressed or not transmitted to make time available to send signaling traffic. The digital voice frames are lost. However, the degradation of the recovered analog voice is minimal provided not too many frames are blanked consecutively. Typically, the transmitter controllers wait for a less-than-full-rate Vocoder frame in which signaling traffic can be multiplexed with voice traffic without the loss of any voice bits.

Multiplexing signaling with voice in less-than-full-rate frames is called dim and burst, which is a time multiplexing technique used on traffic channels to send overhead signaling or (optionally) secondary traffic in which a less-than-full-rate frame of primary digital voice data and overhead or (optionally) secondary traffic data are combined and transmitted at a 9600 bit/second rate.

To allow location estimation, a method called forward link location is known. Reception on forward link location is performed coherently. To maintain coherence, the MS searches for and locks onto a pilot pseudo noise (PN) sequence. Every base station sector broadcasts the pilot PN sequence with a unique known offset, as previously described. The base stations are synchronized, allowing the MS to identify the signal originating from a particular BS sector.

A common IS-95 mobile terminal has four rake receiver fingers, three of which are used to receive an incoming signal and one to search for multipath signals and handover candidates. During operation, the terminal keeps track of the strongest pilot channel in its vicinity. When requested by the BS through a pilot measurement request order (PMRO), the BS will report all pilot signals it receives above a given threshold. The message sent back to the BS includes the magnitude of each pilot, relative to the offset of the base station transmitting the pilot signal.

The pilot signal may be used within the BS as phase reference. Knowing the PN offsets of the pilots transmitted from nearby BSs it is possible to construct TDOA estimates for the BS. As long as the MS is able to detect at least three pilot signals from three different BSs, the location estimation may be possible.

The main problems in location estimation using these methods are synchronization errors in the BSs. These errors result from poor PN resolution and multipath or non-line-of-sight propagation of the received signals.

In particular the specifications 3GGP2 C.S0022-0, v1.0, "Location Service (position determination service)", and 3GPP2 C.S0036-0, v.0, "Recommended Minimum Performance Specifications for C.S0022-0 Spread Spectrum Mobile Stations" describe methods allowing code division multiple access (CDMA) systems to calculate positions of mobile equipment. Depending on where the position calculation is performed, the method may either be mobile station based or mobile station assisted. In a mobile station based solution, the position may be calculated within the mobile phone itself. In the mobile station assisted case, a position may be calculated in a network server, in particular in a position determination entity. The position determination entity may use for its position calculation information provided by the mobile station, in particular phase and time measurements reported by the mobile station.

To allow calculation of a position using a time of arrival or a time difference of arrival method, at least three different pilot phase signals and pilot phase measurements should be provided. The pilot phase measurements are carried out within the mobile stations.

For position calculation within the mobile station, assistance data from the network is required. This assistance data may include the co-ordinates of the reference and neighboring base stations together with their time corrections.

A drawback of known AFLT position measurements using pilot phase measurements is that the pilot phase signal is subject to noise. The noise level causes the pilot phase signal to be disturbed, thus deteriorating the measured pilot phase.

SUMMARY OF THE INVENTION

The invention tries to improve the position calculation by measuring a signal phase of said first signal code within said mobile communications equipment, measuring a carrier signal within said physical communications channels within said mobile communications equipment, reducing a noise level of said measured signal phase by using said carrier signal, and calculating said position of said mobile communications equipment using at least said noise level reduced signal phase.

The mobile communications equipment according to the invention may be a mobile station such as a mobile phone.

According to embodiments, the invention provides using pseudodoppler measurements for smoothing a code phase measurement in particular in an advanced forward link trilateration environment. The method for smoothing the measured signal phase as such is already known for global positioning signal receivers for carrier smoothing, in particular from "High-Precision GPS Navigation with Emphasis on Carrier-Phase Ambiguity Resolution", Lachapelle, et. al, Marine Geodesy, Volume 15, pp. 253-269, 1992, Taylor&Francis.

Pseudodoppler frequency may be understood as the measured Doppler frequency shift received from the communication signal, such as a CDMA signal, received from a base station. Since the transmitter (Base station) and receiver (mobile station) clocks are not synchronized and are subject to drifts, it is referred to as pseudodoppler.

By reducing the noise level of the pilot phase measurement, the quality of position calculation will become more accurate. The smoothed pilot phase measurements will also be more robust against multipath propagation phenomena or other channel impurities.

Carrier smoothing may probably not allow improving position detection. If there are not enough measurements or if the geometry of the base stations is not favorable for position calculation, pseudodoppler measurements probably will not change the situation. However, it is proposed that pseudodoppler measurements are used in improving the quality of pilot phase measurements by reducing the noise of the pilot phase measurements. The noise may be induced by thermal noise, interferences, multipath, etc., which may be reduced by filtering the pilot phase measurements with pseudodoppler frequency.

For calculating said signal phase, a pilot channel may be used. A pilot channel may be an unmodulated, direct-sequence spread spectrum signal transmitted by a CDMA base station or a mobile station. A pilot channel provides a phase reference for coherent demodulation and may provide a means for signal strengths comparison between base stations for determining when to hand-off. A pilot phase offset may be the time difference measured at the mobile station between the earliest arriving useable multipath component of a pilot and the mobile station system time reference.

To obtain the pseudodoppler frequency it is proposed that the phase of said first signal code phase is tracked and said pseudodoppler frequency is obtained from a carrier and/or phase tracking loop. According to another embodiment the pseudodoppler frequency is obtained from matched filter outputs within said mobile communications equipment.

According to yet another embodiment the pseudodoppler frequency is obtained from accumulated carrier phase measurements from a carrier phase tracking loop. Accumulated carrier phase measurement is obtained by integrating the output of the carrier phase tracking loop for a period of time, typically for the time between two code phase measurements (measurement interval). Accumulated carrier phase provides by far the most accurate estimate of the average Doppler frequency between two measurement instances if carrier phase lock has been maintained during the accumulation time without cycle slips. Average Doppler frequency (pseudodoppler) can be calculated by dividing the accumulated carrier phase by the accumulation time.

According to an embodiment, said physical communication channels are transmitted from ground based base stations.

To allow calculating the position within the mobile network, it is proposed that said measured signal phase is transmitted from said mobile communications equipment to a base station.

To allow smoothing of the measured pilot phase within the mobile communications network, it is proposed that said measured pseudodoppler frequency is transmitted from said mobile communications equipment to said base station.

Providing all available and measured information from the mobile station to the base station allows calculating said position within an underlying communications network, or even within a server remotely attached to said network, such as delivering the data to the server via the Internet.

To calculate the position based on the distance of a mobile station, it is possible to use a time of arrival calculation principle, as proposed in the CDMA protocol.

It is also possible to use a time difference of arrival calculation principle.

To assist the mobile station in calculating the position, it is proposed that at least position information of said base station is transmitted from said base station to said mobile communications equipment. Furthermore, time corrections of the base stations may be transmitted.

One possible signal for phase measurement may be a pilot signal code, as proposed in the CDMA protocol.

To facilitate position detection, it is proposed that said base station and said mobile equipment utilize a code division multiple access communication protocol. Within this protocol, advanced forward link trilateration is already described.

A hybrid position calculation may facilitate different methods for position estimation. This may be combining position estimation from Global Navigation Satellite Systems, such as, GPS, Galileo, GLONASS GNSS and position estimation from AFLT measurements. Also any other combination of AFLT measurements with any position estimation using cellular network measurements, Wireless Local Area Network (WLAN), and/or BlueTooth network measurements are possible. Other cellular network measurements may be for example, round-trip time measurement, RX-level, Cell Identity, sector information, etc.

The invention will be described in greater detail in the following figures.

DETAILED DESCRIPTION OF THE INVENTION

Figure 1:
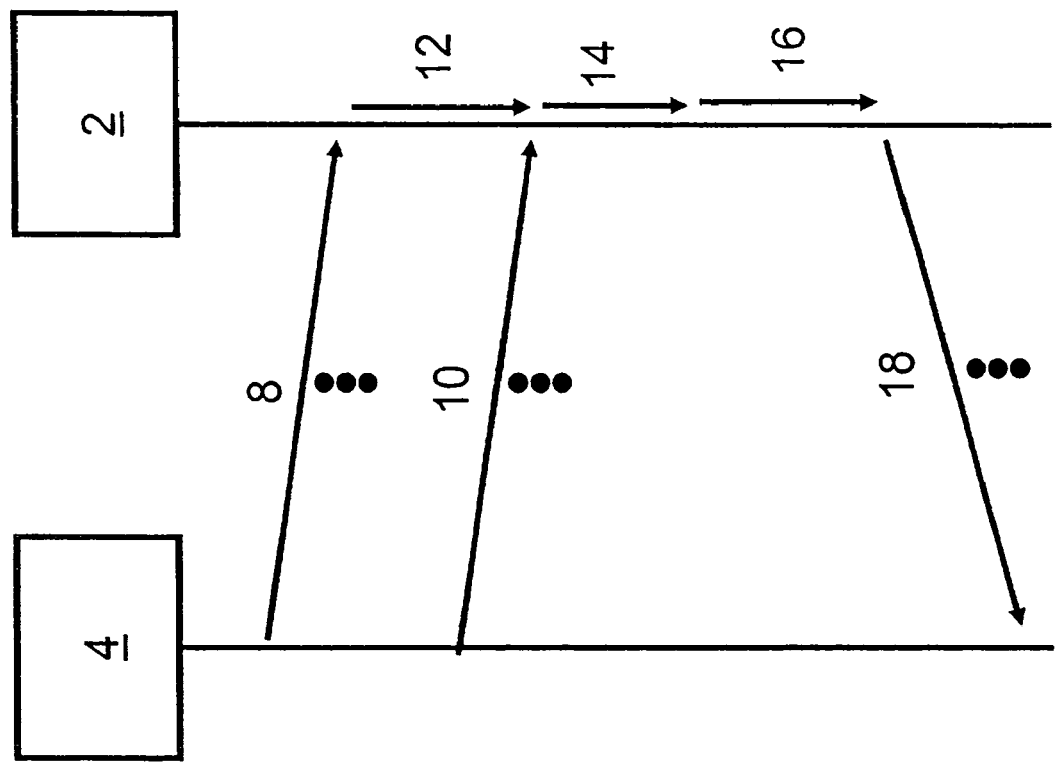
FIG. 1 shows a first flowchart.

FIG. 1 depicts a flowchart of messages exchanged between a mobile station 2 and base station 4. Depicted are only messages between one base station 4 and one mobile station 2, however, to allow position calculation, at least three base stations 4 have to provide signals to one mobile station 2.

Base station 4 provides mobile station 2 with pilot signals 8. The pilot signals 8 are transmitted from base station 4 to mobile station 2 in frequent intervals. Together with pilot signal 8, further position and timing information of base station 4 are transmitted to mobile station 2. These may be the position of base station 4, possibly retrieved from a GPS signal received within the base station, as well as their time shift. The base station 4 may be synchronized with other base stations using a GPS time reference received in the base stations.

Receiving the pilot signal 8 in mobile station 2 allows mobile station 2 to calculate a pilot phase within step 12. This may be done by comparing the phase of pilot signal 8 with a clock reference in the mobile station 2. A clock reference in mobile station 2 corresponds to a clock reference in base station 4, thus a phase shift in pilot signal 8 may be detected in mobile station 2. The pilot signal 8 is transmitted to said mobile station 2 together with further signals 10, such as synchronization channel, paging channels, or traffic channels. These channels may be utilized to obtain a pseudodoppler frequency.

The pilot phase measurement may be inaccurate due to signal noise. Therefore, mobile station 2 may obtain a pseudodoppler frequency. This may be done by tracking the phase of said first signal code phase and said pseudodoppler frequency is obtained from a carrier and/or phase tracking loop. The pseudodoppler frequency may also be obtained from matched filter outputs within said mobile communications equipment.

The pseudodoppler frequency is acquired in step 14 within mobile station 2. Using pilot phase and pseudodoppler frequency, the mobile station 2 may calculate its position in step 16.

To reduce a noise level of said measured signal phase, it is proposed that said noise level is reduced by smoothing the noise level by estimating the signal phase using said pseudodoppler frequency. Because the noise of the signal phase measurement is much larger compared to the pseudodoppler noise, it is advantageous to smooth the pilot phase measurement with the pseudodoppler measurement. The pseudodoppler measurements are used in smoothing by estimating the carrier phase measurements with pseudodoppler frequency. This may be done by $$\rho_{sm}(k) = \omega_{sm}(k) \times \rho_{AFLT}(k) + (1-\omega_{sm}(k)) \times [\rho_{sm}(k-1) + f_{Dopp}(k) \times \Delta T_{AFLT}(K)]$$

where $\omega_{sm}(k)$ = smoothing gain, $\rho_{AFLT}(k)$ = measured pilot phase at time k, $\rho_{sm}(k)$ = smoothed pilot phase at time k, $f_{Dopp}(k)$ = pseudodoppler frequency measurement at time k and $\Delta T_{AFLT}(k)$ = time difference between two AFLT measurements at time k.

To allow providing a minimum smoothing weight, it is proposed that the smoothing gain is reduced as $$\omega_{sm}(k) = \begin{cases} \omega_{sm}(k-1) - 0.01, & \text{if } \omega_{sm}(k-1) > \overline{\omega}_{sm} \\ \overline{\omega}_{sm}, & \text{otherwise} \end{cases}$$

where $\overline{\omega}_{sm}$ is a threshold value for the minimum smoothing weight. It is recommended that $\overline{\omega}_{sm}$ will never be zero. Non-zero values will make the smoother leaky, so that pilot phase smoothing will never purely be based on pseudodoppler measurements. However, the above equations do only represent one possible smoothing algorithm. Numerous other algorithms for smoothing the AFLT pilot phase measurements with pseudodoppler frequency are possible.

The calculated position may be provided to base station 4 with a position message 18.

According to embodiments the pseudodoppler frequency is obtained from accumulated carrier phase measurements from a carrier phase tracking loop. Accumulated carrier phase measurement is obtained by integrating the output of the carrier phase tracking loop for a period of time, typically for the time between two code phase measurements (measurement interval). Accumulated carrier phase provides by far the most accurate estimate of the average Doppler frequency between two measurement instances if carrier phase lock has been maintained during the accumulation time without cycle slips. Average Doppler frequency (pseudodoppler) can be calculated by dividing the accumulated carrier phase by the accumulation time.

The depicted method may be carried out within frequent intervals or upon request. Depicted is only one interval.

Figure 2:
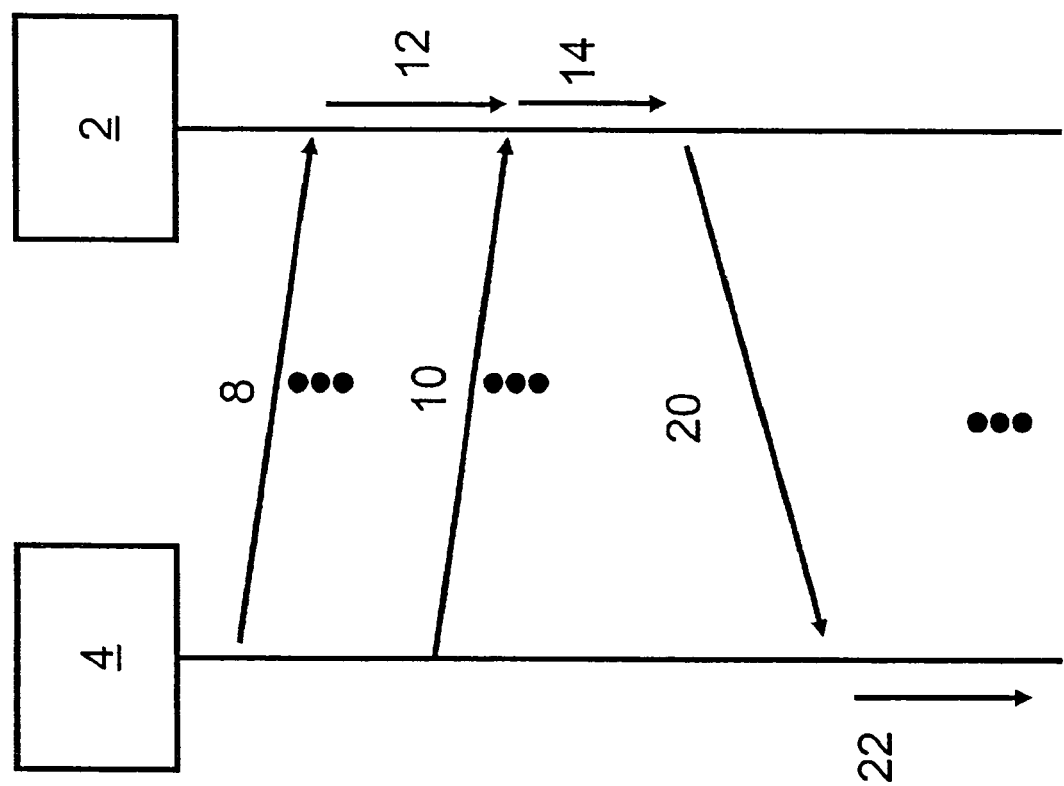
FIG. 2 shows a second flowchart.

A method for calculating a position of a mobile phone using advanced forward link trilateration, by receiving physical communication channels with the mobile communications equipment, receiving first signal codes within physical communication channels, measuring a signal phase of said first signal code within said mobile communications equipment, measuring a pseudodoppler frequency within said physical communications channels within said mobile communications equipment, smoothing said pilot signal phase by using said pseudodoppler frequency, and calculating said position using at least said smoothed pilot signal phase is provided according to embodiments. FIG. 2 depicts position calculation within the mobile network. FIG. 2 corresponds to FIG. 1 up to step 14. In mobile station 2 pilot phase measurements and pseudodoppler frequency are available. This information is provided within a position message 20 to base station 4. Using the pilot phase information and the pseudodoppler frequency, base station 4 calculates the position of mobile station 2 in step 22.

Figure 3:
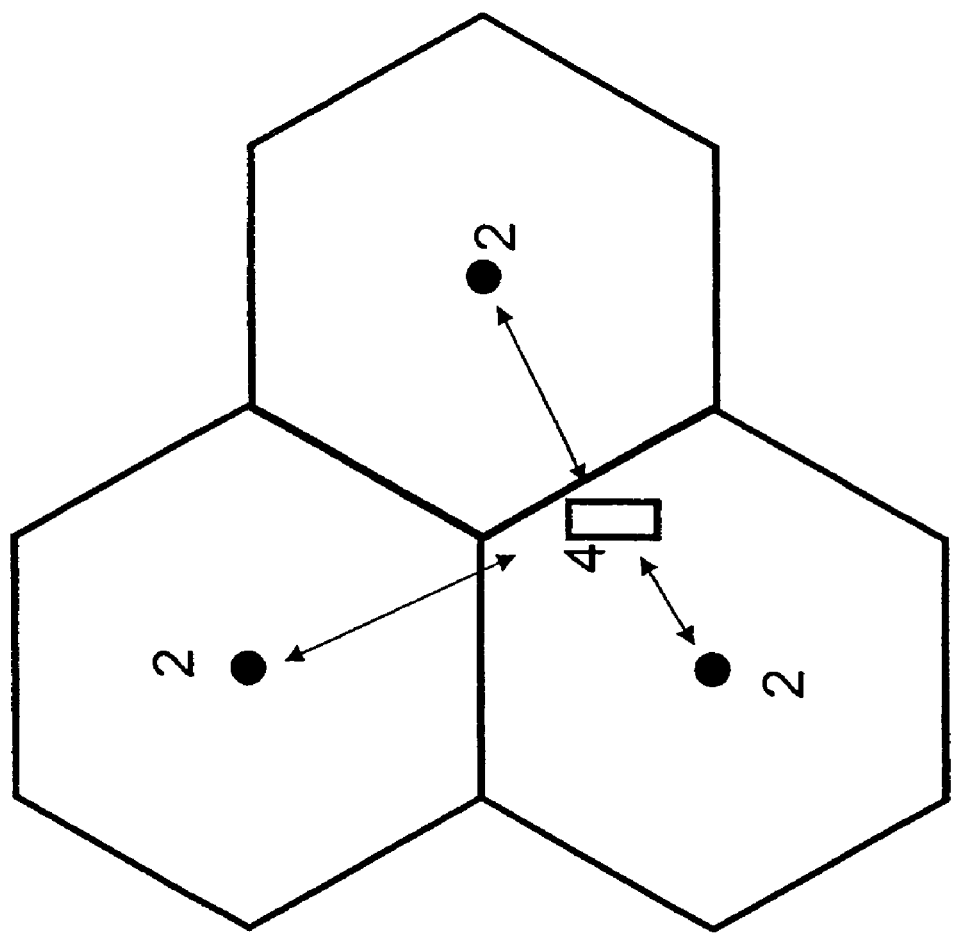
FIG. 3 shows a system for position detection.

FIG. 3 depicts a system allowing position calculation with pilot phase smoothing using pseudodoppler frequency. Depicted is mobile station 4 in a cellular network comprising base stations 2. Mobile station 4 receives and transmits communication signals comprising physical communication channels to and from base stations 2, comprising pilot phase signals, synchronisation channels, paging channels and/or traffic channels. These channels may carry position information and position measurements information.

The signals, in particular CDMA signals, are doppler shifted, whereby the time references of the BS 2 and the mobile station 4 are shifted, thus resulting in a pseudodoppler frequency.

Using the pseudodoppler frequency together with the pilot phase provided from the base station 2, mobile station 4 may calculate its position or provide base station 2 with position information enabling base station 2 to calculate the position of mobile station 4.

Figure 4:
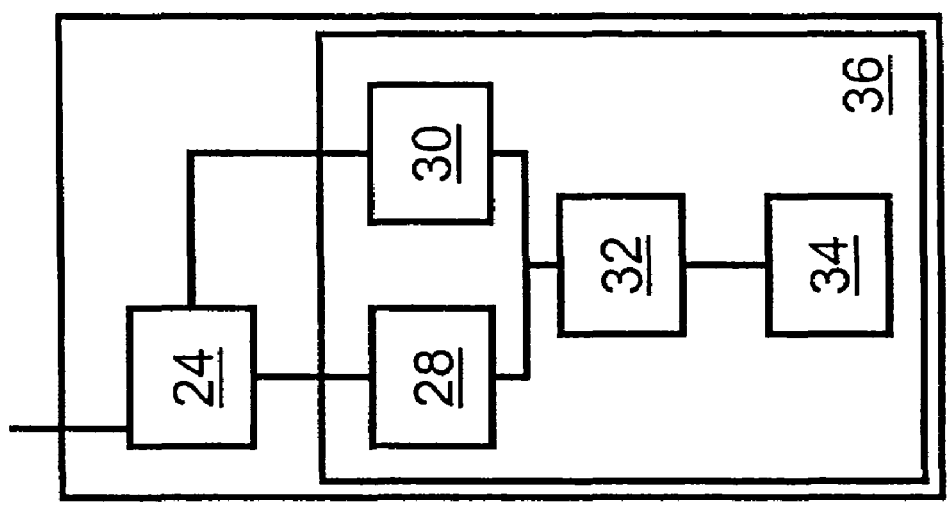
FIG. 4 shows an inventive mobile station.

FIG. 4 depicts a mobile station 2 being able to calculate its position using a pilot phase measurement and a pseudodoppler frequency received from a CDMA base station. Reception means 24 allow receiving CDMA signals. The CDMA signals may comprise a pilot signal. The CDMA signals are provided to signal processors 28, 30.

Signal processor 28 calculates a pseudodoppler frequency from the CDMA signal.

The CDMA signals are also provided to signal processor 30. Within signal processor 30, a phase shift of the pilot signal is measured. The phase of the pilot signal as well as the pseudodoppler frequency of the CDMA signal are provided to calculation means 32. Within calculation means 32, a noise level of said pilot phase is reduced by smoothing this signal with the pseudodoppler frequency. The resulting signal is used for calculating a position of the mobile station 2 within position calculation means 34.

The signal processors 28, 30, the calculation means 32 and the position calculation means may be encapsulated within a module 36. This module may be provided in the mobile communication equipment if required for improved position calculation.

Not depicted but also possible is to provide the information obtained in signal processors 28 and 30 via CDMA reception means 24 to a base station. Within the base station the position of mobile station 2 is then calculated.

According to embodiments a mobile communications equipment is provided comprising reception means for receiving a physical communication channels, a first signal processor for measuring a signal phase of a first signal code within said physical communication channels, a second signal processor for calculating a pseudodoppler frequency within said physical communications channels, and calculation means for calculating a noise level reduced signal phase by using said pseudodoppler frequency.

In addition, according to embodiments, a mobile communications equipment is provided comprising reception means for receiving a physical communication channels, a first signal processor for measuring a signal phase of a first signal code within said physical communication channels, a second signal processor for calculating a pseudodoppler frequency within said physical communications channels, calculation means for calculating a noise level reduced signal phase by using said pseudodoppler frequency, and position calculation means for calculating said position using at least said noise level reduced signal phase.

In addition, a system for calculating a position of a mobile communications equipment is provided comprising in particular a mobile phone, and at least one ground based base station providing physical communication channels comprising a first signal code, at least one mobile communications equipment, wherein said mobile communications equipment comprises a first signal processor for measuring a signal phase of a first signal code within said physical communication channels, a second signal processor for calculating a pseudodoppler frequency within said physical communications channels, and calculation means for calculating a noise level reduced signal phase by using said pseudodoppler frequency, is another aspect of the invention.

A computer program and a computer program product for calculating a position of a mobile communications equipment, operable to cause a processor of a mobile communication equipment, as depicted in FIG. 4 to receive physical communication channels within the mobile communications equipment, receive first signal codes within said physical communication channels, measure a signal phase of said first signal code within said mobile communications equipment, measure a pseudodoppler frequency within said physical communications channels within said mobile communications equipment, and reduce a noise level of said measured signal phase by using said pseudodoppler frequency, is another aspect of the invention.

The invention allows a more accurate position detection of a mobile station by smoothing a detected phase signal using a pseudodoppler frequency of a CDMA signal.

What is claimed is:

1. Method, comprising:
 receiving signals from physical communication channels in a mobile communication device, said signals including a first signal code and a carrier signal,
 measuring a signal phase of said first signal code,
 measuring a frequency shift of said carrier signal,
 reducing a noise level of said measured signal phase by using said frequency shift, and
 calculating a position of said mobile communication device using at least said noise level reduced signal phase, wherein said signal phase is a signal code phase; wherein reducing said noise level of said measured signal code phase by using said frequency shift comprises filtering said measured signal code phase with said frequency shift.

2. The method of claim 1, wherein said measured frequency shift is a pseudodoppler frequency.

3. The method of claim 1, wherein said frequency shift is obtained from an accumulated carrier phase measurement.

4. The method of claim 1, wherein said filtering is done by carrier smoothing.

5. The method of claim 1, wherein a threshold value for estimating said signal code phase is defined.

6. The method of claim 1, wherein the signal code phase of said first signal code is tracked and said frequency shift is obtained from a carrier and/or phase tracking loop.

7. The method of claim 1, wherein said frequency shift is obtained from matched filter outputs within said mobile communication device.

8. The method of claim 1, wherein said physical communication channels are transmitted from ground based base stations.

9. The method of claim 1, wherein said signal phase is transmitted from said mobile communication device to a base station.

10. The method of claim 9, wherein said measured frequency shift is transmitted from said mobile communication device to said base station.

11. The method of claim 1, wherein said position is calculated within an underlying communications network.

12. The method of claim 1, wherein said position is calculated using a time of arrival calculation principle.

13. The method of claim 1, wherein said position is calculated using a time difference of arrival calculation principle.

14. The method of claim 1, wherein at least position information of a base station is transmitted from said base station to said mobile communication device.

15. The method of claim 1, wherein said first signal code is a pilot signal code.

16. The method of claim 1, wherein a base station and said mobile communication device communicate utilizing a code division multiple access communication protocol.

17. The method of claim 1, wherein said position is calculated using a hybrid position calculation.

18. The method of claim 1, wherein the carrier signal is received within a communication channel of the physical communication channels.

19. The method of claim 1, wherein the first signal code is received within a pilot channel of the physical communication channels.

20. System, comprising:
 at least one base station for providing physical communication channels, and
 at least one mobile communication device,
 wherein said mobile communication device comprises:
 a receiver for receiving communication signals within said physical communication channels,
 a first signal processor for measuring a signal phase of a first signal code received within said physical communication channels, a second signal processor for calculating a frequency shift from a carrier signal received within said physical communications channels, and a calculation device for calculating a noise level reduced signal phase by using said frequency shift, wherein the system further comprises:

a position calculation device for calculating a position of said mobile communication device using at least said noise level reduced signal phase, wherein said signal phase is a signal code phase; wherein reducing said noise level of said measured signal code phase by using said frequency shift comprises filtering said measured signal code phase with said frequency shift.

21. The system of claim 20, wherein the first signal processor measures the signal phase of the first signal code received within a pilot channel of the physical communication channels.

22. The system of claim 20, wherein the second signal processor calculates the frequency shift of the carrier signal received within a communication channel of the physical communication channels.

23. Computer program product, comprising a computer-readable medium storing program codes thereon for use in a mobile communication device, said program codes comprising: instructions for receiving signals from physical communication channels within the mobile communication device, said signals including a first signal code and a carrier signal, instructions for measuring a signal phase of said first signal code, instructions for measuring a frequency shift from the carrier signal received from said physical communications channels, and instructions for reducing a noise level of said measured signal phase by using said frequency shift, wherein said signal phase is a signal code phase; wherein said instructions for reducing said noise level of said measured signal code phase by using said frequency shift comprises instructions for filtering said measured signal code phase with said frequency shift.

24. The computer program product of claim 23, wherein the program codes further comprise:

instructions for calculating a position of said mobile communication device using at least said noise level reduced signal phase.

25. The computer program product of claim 23, wherein the first signal code is received within a pilot channel of the physical communication channels.

26. The computer program product of claim 23, wherein the carrier signal is received within a communication channel of the physical communication channels.

27. A mobile communication device, comprising:

means for receiving communication signals in physical communication channels, means for measuring a signal phase of a first signal code received within said physical communication channels, means for calculating a frequency shift from a carrier signal received within said physical communications channels, and means for calculating a noise level reduced signal phase by using said frequency shift, and means for calculating a position of said mobile communication device using at least said noise reduced signal phase, wherein said signal phase is a signal code phase; wherein reducing said noise level of said measured signal code phase by using said frequency shift comprises filtering said measured signal code phase with said frequency shift.

* * * * *

UNITED STATES PATENT AND TRADEMARK OFFICE
CERTIFICATE OF CORRECTION

| | | |
|---|---|---|
| PATENT NO. | : 7,395,074 B2 | Page 1 of 1 |
| APPLICATION NO. | : 10/821126 | |
| DATED | : July 1, 2008 | |
| INVENTOR(S) | : Jari Syrjärinne | |

It is certified that error appears in the above-identified patent and that said Letters Patent is hereby corrected as shown below:

On patent cover sheet under "References Cited item (56) – Other Publications," please insert the following two references:

--G. Lachapelle et al., "High-precision GPS navigation with emphasis on carrier-phase ambiguity resolution," Marine Geodesy, vol. 15, pages 253-269.

J. Farrell et al., "The global positioning system and inertial navigation," pages 257-263.--

Signed and Sealed this

Third Day of August, 2010

David J. Kappos
*Director of the United States Patent and Trademark Office*